Patented Sept. 23, 1941

2,257,085

UNITED STATES PATENT OFFICE 2,257,085

ZINC LIQUATION

Johannes Thede, Stolberg, Germany, assignor to Stolberger Zink Aktiengesellschaft für Bergbau und Huttenbetrieb, Aachen, Germany, and Metallgesellschaft Aktiengesellschaft, Frankfort-on-the-Main, Germany, both corporations of Germany No Drawing. Application May 12, 1939, Serial No. 273,344. In Germany May 20, 1938

5 Claims. (Cl. 75—88)

The present invention relates to an improved process for liquating zinc from zinc dust and similar products containing elemental zinc.

It is an object of this invention to provide a process whereby the space in liquation furnaces may be better utilized in the liquation of zinc.

It is a further object of the invention to provide a process whereby the liquation of zinc from zinc dust and similar products containing zinc is accelerated and the yield in liquated zinc is increased.

For the liquation of zinc from zinc dust, zinc powder or similar substances containing elemental zinc, moving externally-heated vessels, preferably rotary drums, may be employed. The zinciferous metals to be liquated are introduced into these vessels without the addition of fluxing materials, and the inner surfaces of the walls of such vessels are maintained at a temperature above the melting point of zinc. When employing these means for the liquation, the friction of the zinc particles against the inner surfaces of the moving walls of the liquation vessel operates to cause destruction of the oxide coatings upon the zinc particles whereby coalescence of the zinc contained therein is facilitated. The liquation of zinciferous materials may be carried out in other types of apparatus while maintaining similar conditions therein, such as in electrically-heated vessels or in vessels wherein the material to be heated comes in direct contact with heating gases.

In the course of the liquation the volume of the charge present in the liquating furnace decreases considerably. The volumetric decrease is greatest when a portion of the zinc contained in the charge has separated beneath the charge in the form of a molten metal bath and progresses until about one-half of the zinc has been liquated out of the charge. This occurs after about two-thirds of the liquation period for the charge has passed and the charge then has only about one-third of its original volume. Consequently, during a considerable portion of the liquation a substantial portion of the space available in the liquation apparatus is wasted. If an attempt is made to utilize such space which has been produced by the reduction in the volume of the charge by introducing a fresh batch of material to be liquated when the volume decrease is greatest or when substantial quantities of zinc have already liquated out to produce a molten zinc bath in the bottom of the liquating vessel, it is found that a practical, economic advantage cannot be obtained. The addition of a further charge of fresh material at such point in the liquation increases the normal period for liquating a charge by one-half and even more, so that the space in the liquation furnace is not utilized more economically.

It has now been discovered, in accordance with the present invention, that the liquation furnace space may be better utilized and the yield per furnace unit considerably increased by introducing an additional charge of zinciferous material into the furnace not later than the point when the original charge has been heated to such an extent that it has assumed a plastic or dough-like condition, which occurs when the temperature of the charge has approximately reached the melting point of zinc.

This condition of the charge is reached, for example, in an externally-heated, liquating drum having a diameter of one meter and a length of two meters after heating for a period of about one and one-half to two hours. At such point substantial amounts of zinc have not yet separated out in liquid form, but the volume decrease of the charge is nevertheless already so great that a substantial additional charge may be introduced into the furnace.

When operating in that manner, it was unexpectedly discovered that there is no necessity for lengthening the time for the liquation of the charge. For an equal liquation period the percentage yield of zinc is almost the same as when working without addition of material during the liquation. Furthermore, it is not even necessary to increase the heating of the furnace. In some cases, when it is not necessary to obtain the greatest possible utilization of the furnace space, the additional charge may even be introduced at an earlier time, for example, one-half or one hour after commencing the liquation operation. In such instance also no delay or disturbance in the liquation occurs, nor is the yield impaired.

It has furthermore been found that it is possible to shorten the time necessary for liquation of zinc when compared with the known procedures and to increase the yield considerably, especially so when the zinciferous material heated contains considerable amounts, for example 30% to 40%, of oxidic zinc compounds or non-zinciferous substances. In such instances the amount of metallic zinc normally retained in the liquation residues is considerable.

In accordance with the present invention, it was discovered that this is not caused by a lack of sufficient friction to effect destruction of the oxide coatings upon individual zinc particles sufficiently to facilitate coalescence of the zinc when rotating or moving furnaces are employed for the liquation, for upon further constant stirring or raking of the liquation residue, further amounts of metallic zinc will separate out and coalesce. Based upon this observation, it was discovered that if the peripheral speed of the moving, and particularly the rotating, liquating furnace employed in the process in accordance with the present invention is increased beyond that necessary for the production of good friction and the breaking of the zinc oxide skins upon the zinc particles, and to such an extent that centrifugal forces are produced in the charge, the coalescence of the metallic zinc particles is accelerated. The amount of the centrifugal forces produced in the charge must be sufficient to overcome the force of attraction between the oxidic portion of the charge and the zinc particles liberated by the friction. The coalescence of the separate particles may be accelerated to such an extent that the time consumed for the liquation of the charge may be reduced by about 15%, while increasing the yield by about 10% to 15%.

The centrifugal forces which are to be produced within the charge are such as would be produced when the liquation is carried out in a drum of one meter in diameter, rotating at a speed of from four to twenty revolutions, preferably from nine to twelve revolutions, per minute.

For example, the separation of zinc is most favorable when an externally-heated drum one meter in diameter is caused to rotate at a speed of from four to twenty revolutions, preferably nine to twelve revolutions, per minute. Such speeds of rotation are otherwise generally not utilizable for internally or externally heated furnaces because the shell of the furnace and, above all, the refractory lining thereof are heavily stressed by the resulting vibrations. In the process of the present invention, these disadvantages have not occurred, which is apparently caused by the fact that the temperatures within the furnace and the charge become very much more uniform and, above all, that overheating of certain parts of the furnace shell does not occur, although this is difficult to avoid under other conditions. The contents of the liquating furnace, in dust or dough-like form, also apparently produce intense damping of the vibrations which are unavoidable in consequence of the high speeds of rotation.

If starting materials are treated, which in comparison with zinc dust and trass contain only small amounts of metallic zinc, or in which the separation and coalescence of the liquid zinc causes difficulty, for example zinc dust containing a high proportion of very fine grain size (for example, from $0.1\mu$ to $1\mu$) and thick oxide skins, improved results are obtainable with the process of the present invention when zinc in compact form, for example zinc plates or zinc scrap, is added to the charge. This zinc then melts when the melting point is reached in the drum and forms a bath which then dissolves the finely-divided metal out of the charge material.

The following example serves to illustrate the invention, but this invention is in no way limited thereto:

2400 kgs. of a mixture of trass and zinc dust containing 76% of metallic zinc were treated in an externally heated, rotary drum one meter in diameter and two meters in length. After ninety minutes the charge had assumed a plastic, lumpy condition. At that point 1250 kgs. of the same starting material were added to the drum. The treatment, including charging, running off the zinc and removing the residues, took eight hours. The yield of zinc amounted to 95%. The drum rotated at nine revolutions per minute. No disturbing generation of gas, explosions or the like occurred.

The influence of the centrifugal action is revealed by the fact that with a rotational speed of one and one-half revolutions per minute, at which speed the most favorable friction but no substantial centrifugal forces occurred within the charge, a smaller yield of zinc was obtained. When the drum rotated at one and one-half revolutions per minute, with the same starting material and otherwise under identical conditions, the operation took from nine to twelve hours, while the yield of zinc was from 82% to 83%. At a speed of nine revolutions per minute it was possible to reduce the operating time to seven hours, while raising the yield to from 92% to 94%.

Similar results are also obtained by the process of the present invention, when it is carried out in other moving liquating furnaces, such as electric furnaces, furnaces in which the material is heated directly by heating gases, or in furnaces provided with stirring mechanism.

I claim:

1. In a batch process for liquating zinc from zinciferous material of the type of zinc dust and trass containing elemental zinc the steps comprising introducing a charge of the zinciferous material to be liquated into a moving liquating furnace, heating such charge, then introducing a further charge of the material to be liquated into the furnace after the original charge has suffered a decrease in volume but not later than the time when the original charge has reached a plastic or dough-like state, said further charge being added before a substantial quantity of zinc has been liquated from the original charge of zinciferous material and continuing the liquation.

2. In a batch process for liquating zinc from zinciferous material of the type of zinc dust and trass containing elemental zinc in a rotating furnace the steps comprising introducing a charge of zinciferous material to be liquated into the liquating furnace, heating such charge, then introducing a further charge of the material to be liquated into the furnace after the original charge has suffered a decrease in volume but not later than the time when the original charge has reached a plastic or dough-like state, said further charge being added before a substantial quantity of zinc has been liquated from the original charge of zinciferous material and continuing the liquation, and during the liquation maintaining the peripheral speed of the rotating furnace sufficiently high to effect centrifugal forces in the charge promoting separation of zinc in addition to friction upon the charge.

3. In a batch process for liquating zinc from zinciferous material such as zinc dust and trass containing elemental zinc the steps comprising introducing a charge of the material to be liquated into a rotary furnace, heating such charge, then introducing a further charge of the material to be liquated into the furnace after the original charge has suffered a decrease in volume but not later than the time when the original charge has reached a plastic or dough-like state, said further charge being added before a substantial quantity of zinc has been liquated from the original charge of zinciferous material and continuing the liquation, and during the liquation maintaining the peripheral speed of the rotary furnace sufficiently high to effect a centrifugal force upon the charge equal to that obtained in a rotating furnace of one meter in diameter rotating at four to twenty revolutions per minute.

4. A process according to claim 1 comprising in addition the step of adding compact elemental zinc to the liquating furnace.

5. In a batch process for liquating zinc from zinc dust, the elemental zinc particles of which have thick oxide skins, comprising introducing a charge of such zinc dust into a rotary liquating furnace, adding elemental zinc in compact form to such charge, heating such charge, then introducing a further charge of the material to be liquated into the furnace after the original charge has suffered a decrease in volume but not later than the time when the original charge has reached a plastic or dough-like state, said further charge being added before a substantial quantity of zinc has been liquated from the original charge of zinciferous material, and continuing the liquation.

JOHANNES THEDE.